United States Patent [19]

Patterson et al.

[11] 3,815,262

[45] June 11, 1974

[54] IN-FLIGHT RETRACTIBLE LANDING GEAR TRAINING SIMULATOR FOR FIXED LANDING GEAR AIRCRAFT

[75] Inventors: Ronald A. Patterson, 1010 Ross Ln., North, Medford, Oreg. 97501; Walter N. Majure, Jacksonville, Oreg.

[73] Assignee: said Ronald A. Patterson, by said Majure

[22] Filed: May 29, 1973

[21] Appl. No.: 364,719

[52] U.S. Cl. .............................. 35/12 B, 35/12 F
[51] Int. Cl. ............................................. G09b 9/08
[58] Field of Search ....... 35/12 R, 12 B, 12 C, 12 F, 35/12 K, 12 S, 12 W, 12 N, 12 P, 8 R, 9 R, 9 A, 9 B, 22 R, 10.2; 73/178 T; 340/27 R, 27 NA; 273/139, 141 A

[56] References Cited
UNITED STATES PATENTS

| | | | |
|---|---|---|---|
| 2,714,200 | 7/1955 | Teegarden | 340/27 R |
| 2,963,795 | 12/1960 | Viehmann, Jr. | 35/12 W |
| 3,161,852 | 12/1964 | Timm | 340/27 R |
| 3,439,321 | 4/1969 | Sebern | 340/27 R |
| 3,471,627 | 10/1969 | Ziegler | 35/12 W X |
| 3,541,550 | 11/1970 | Hamre | 340/27 R X |

*Primary Examiner*—Jerome Schnall
*Assistant Examiner*—Yance Y. Hum

[57] ABSTRACT

When a pilot, fully qualified and licensed, and possibly of long accident-free experience, in the flying of fixed landing gear aircraft, desires to progress to retractible landing gear aircraft, the insurance companies require extensive flight practice with an instructor as a condition precedent to the issuance of a required insurance policy. The present invention provides a simple, compact, inexpensive simulator for installation on fixed landing gear aircraft, having (1) a manually operable actuator corresponding to the landing gear lowering actuator provided conventionally on rectractible landing gear aircraft, (2) indicator means responsive thereto for randomly simulating either correct lowering and locking of the individual landing wheels or a malfunction of one or more of the landing wheels, and (3) means corresponding to a conventional emergency landing gear lowering actuator for cancelling any indication or indications of malfunction. The simulator further includes a sounding device and a warning light for reminding the pilot that he has overlooked "lowering the landing gear" whenever he has cut the throttle without having gone through the landing gear lowering procedure, and for calling attention to the fact that not all landing gear lights are lighted when they should be.

9 Claims, 5 Drawing Figures

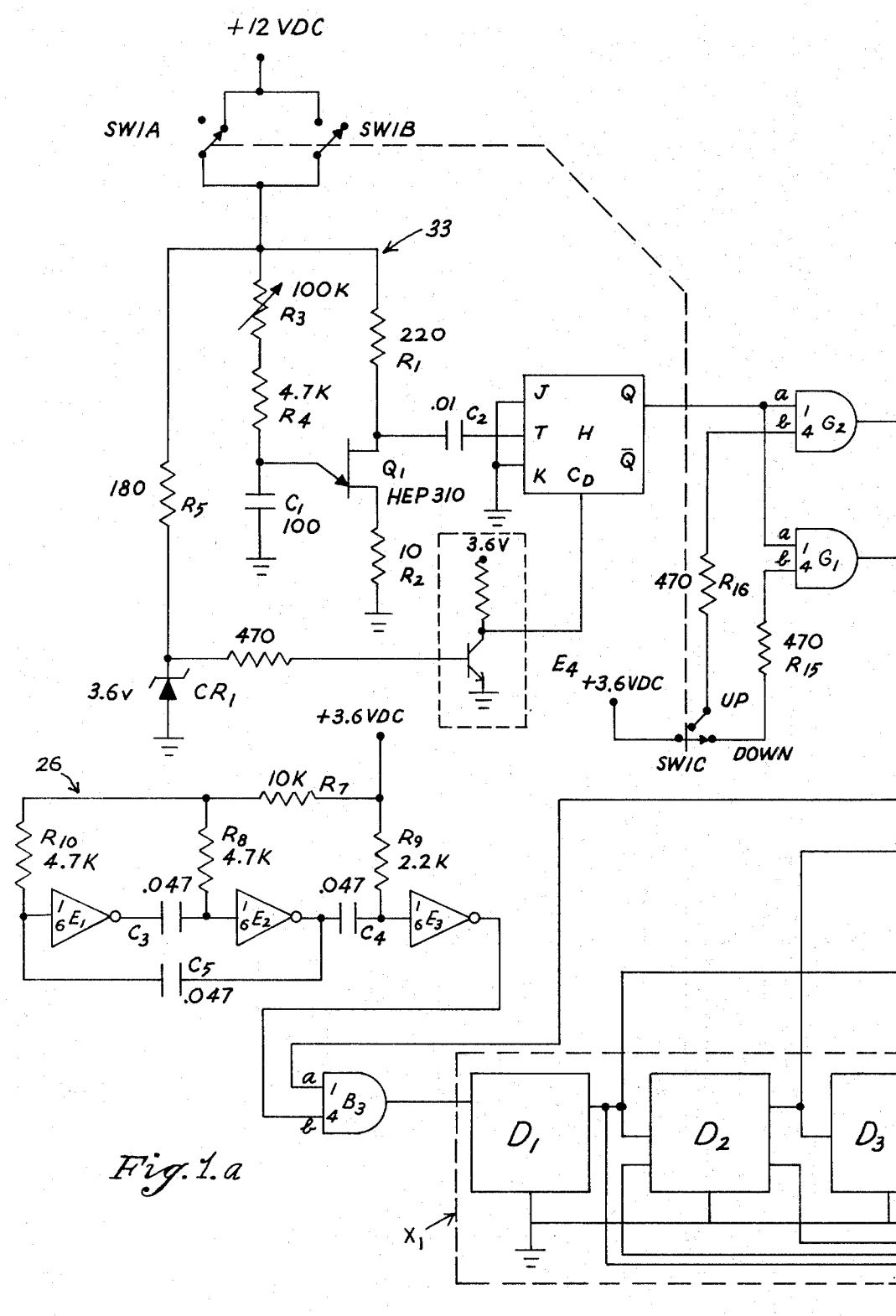
Fig. 1.a

PATENTED JUN 11 1974 3,815,262

IN-FLIGHT RETRACTIBLE LANDING GEAR TRAINING SIMULATOR FOR FIXED LANDING GEAR AIRCRAFT

This invention relates to aircraft pilot training. Most users of private or rental planes start with a plane having fixed landing gear and are qualified and licensed through required training and experience to operate such aircraft capably and responsibly.

Many such pilots later desire to progress to retractible landing gear aircraft. In such circumstances, however, insurance companies require such licensed pilots to go through an extensive and expensive further flight training program, with instructors, as a pre-condition to issuing of required insurance.

Such training can cost anything from $150 up to $1,500 or more, and may involve actual flight training with an instructor for from 5 hours to 50 hours. This, together with the cost of the new airplane, is frequently a sufficient deterent to induce the pilot involved to drop the project. The insurance companies can be rather arbitrary in such matters. They undoubtedly rate an accident-free record on fixed landing gear aircraft a plus. From one point of view the longer such a record has been maintained, the higher the rating should be. From another point of view, however, the longer the experience, the more confirmed the pilot will presumably have become in his non-retractible landing gear habits. In any event, some need for remedial training and practice is definitely in order.

The present invention is designed to ameliorate the requirement for instructor training. It involves the added installation on aircraft with fixed landing gear of manually operable elements corresponding to those required for control of retractible landing gear aircraft, together with indicators like those found on typical retractible landing gear aircraft, all of which would have to be given due attention where retractible landing gear is actually involved.

Our simulator includes indicator means set into operation by the lowering of a member like that which would lower landing gear wheels, for indicating that all wheels have or have not been lowered as intended. It simulates at random, and without planning, both normal and abnormal landing gear operation, and itself generates simulated malfunctions and successes. The simulated malfunctions and successes are beyond the control of the student pilot or his instructor. A corrective control is provided, like the emergency landing gear lowering member found on retractible landing gear aircraft. On retractible landing gear aircraft, the control referred to would correct the malfunction and at the same time remove the indication of a malfunction. When the simulator is employed on fixed landing gear aircraft, it eliminates the indication of a pretended malfunction.

Provision is further made for warning the pilot visually and audibly if (1) one or more of the landing gear lights failed to come on as intended, or (2) he cuts the throttle before "lowering the landing gear."

With this kind of equipment for practice, the pilot can be self-taught, at least to a large extent, and, other factors being favorable, the insurance companies may reasonably be expected to waive a large part, at least of the instructor training requirement. Since a belly landing involves a very high risk, the student pilot should be his own severest critic.

Other objects and advantages will hereinafter appear.

In the drawing forming part of this specification:

FIGS. 1a, 1b and 1c, placed side by side in the order stated from left to right, jointly form an electrical diagram of a practical and advantageous simulator, illustrative of the invention;

Figure 1B:
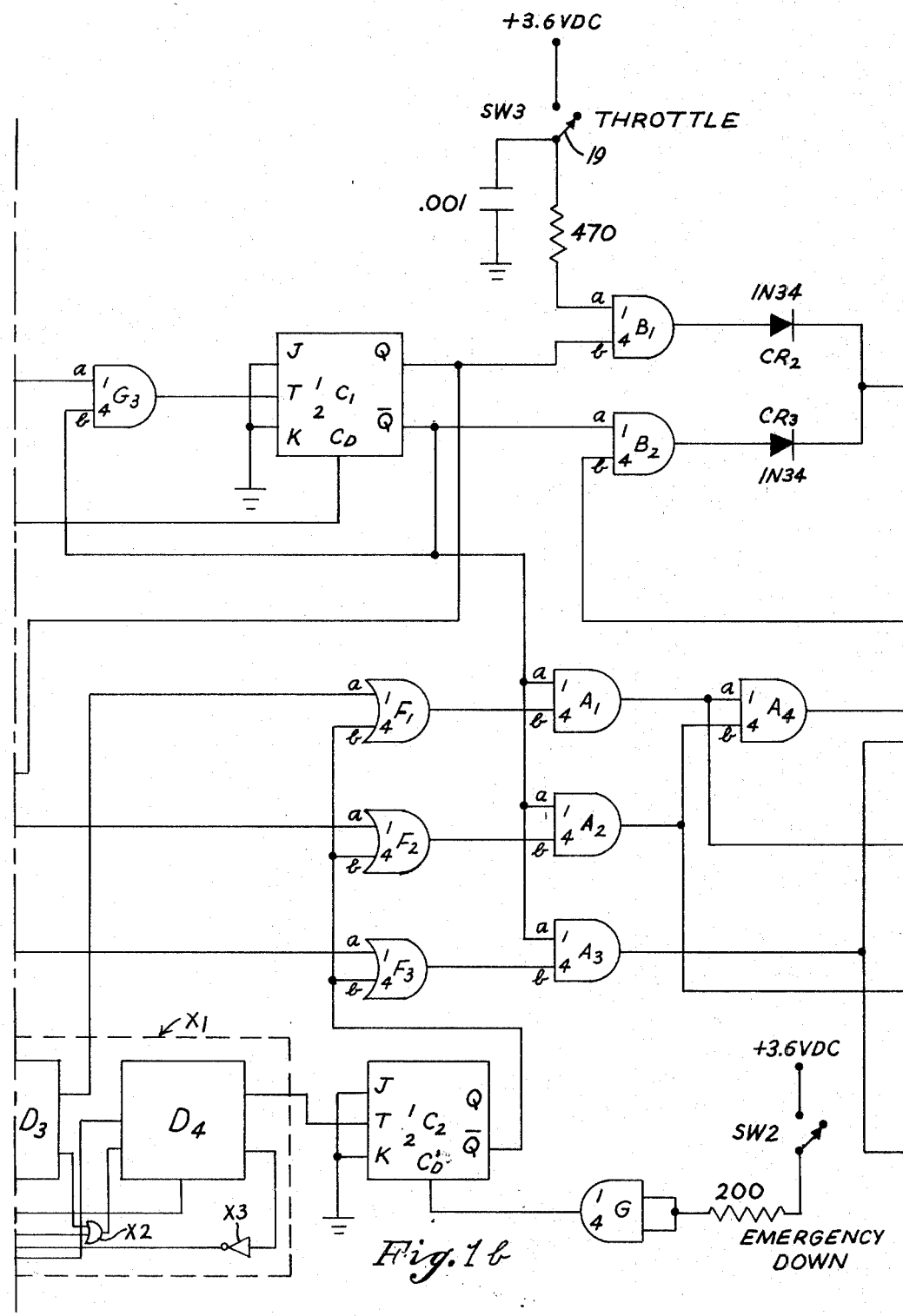
Figure 2:
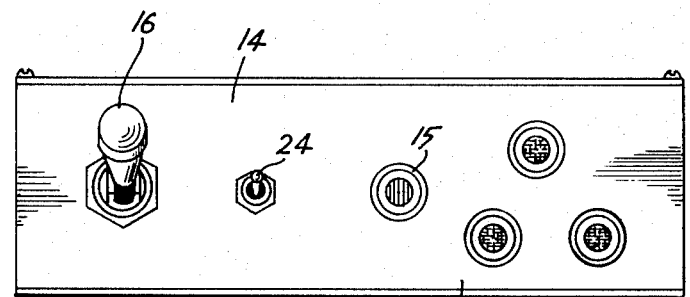
FIG. 2 is a view in front elevation of the simulator of FIG. 1.
Figure 3:
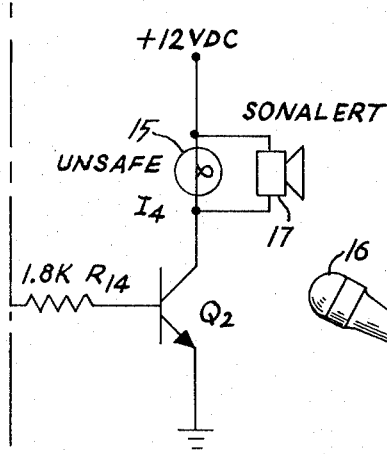
FIG. 3 is a view in side elevation of the same simulator.
Figure 3:
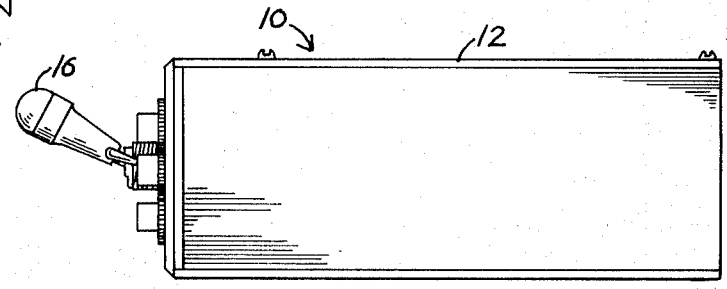
Figure 1C:
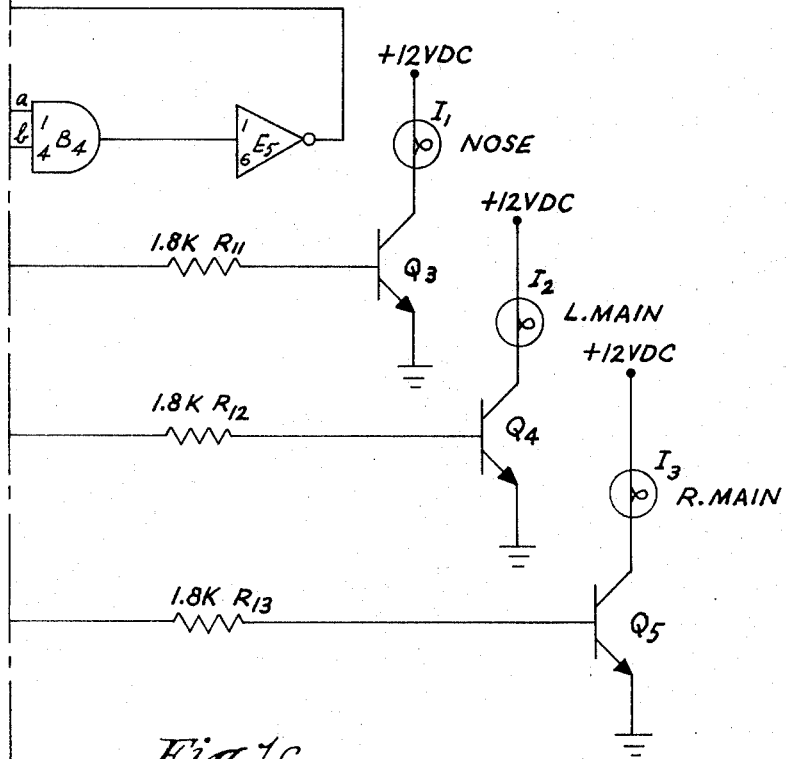

Power for the operation of the simulator unit is made available from the 12-volt direct current aircraft source through a master switch, not shown. Where a lesser input is indicated on the drawing, it may be assumed that the twelve-volt power supply has been routinely stepped down at that point by conventional and well known means. The master switch may be operated to turn on and off the power supply to all electrically operated instrumentalities on the plane including the simulator.

A brief outline of the "landing gear lowering" procedure and operating means will be followed by a more detailed description.

The simulator 10, which is adapted to be made a temporary part of the instrument panel of a fixed landing gear airplane, in the direct field of observation of the pilot, includes a rectangular box 12 which has its own restricted instrument panel 14. Aside from an external throttle switch and a line for supplying power to the simulator, all of the simulator instrumentalities and circuit components are housed in the box 12 or are affixed to it through the panel 14.

A primary control member or actuator 16, having an up position corresponding to "landing gear up," an intermediate neutral position, and a down position, corresponding to "landing gear down," remains in its normal, in-flight, up position until a landing is to be made. This actuator 16 is the normal "landing gear lowering and raising" control member of the simulator.

In preparing for landing, the pilot should first set the actuator 16 in its down position before cutting the throttle 19. If he cuts the throttle before going through the procedure for lowering the landing gear, thereby closing switch SW3, a red light 15 will be turned on and a buzzer, horn or other suitable sounding device 17 will sound off continuously until remedial action is taken. The light 15 and the sounding device 17 are collectively designated 14.

Such remedial action will involve the re-opening of the throttle, followed by the overlooked setting of the actuator 16 to its down position. The consequence of this will be:

1. The initiation of a timed cycle coinciding substantially in duration with the time required for lowering the landing wheels of the retractible landing gear plane which the student pilot expects to acquire or have access to;
2. The generating and transmitting during that delay period of variable random impulses induced by a free-running pulse generator 26 to inputs marked "b" of three and gates A1, A2 and A3, which and gates will, at the end of the period, control, respectively, the turning on of green lights 11, 12 and 13;
3. The maintaining at zero of the "a" inputs to the and gates A1, A2 and A3 throughout the "landing gear lowering" period so that none of the lights I1, I2 and I3 will be lighted during that period;

4. Abruptly, at the end of that period, setting the "*a*" inputs of the and gates A1, A2 and A3 from low to high, to institute and maintain illumination only of such of the lights I1, I2 and I3 whose controlling and gates randomly happen to have high "*b*" inputs precisely at the end of the "landing gear lowering" period; and 5. Substantially simultaneously freezing the "*b*" inputs to the and gates A1, A2 and A3 originated by the free-running pulse generator 26.

At the conclusion of the "landing gear lowering" period, if any one or more of the lights I1, I2 and I3 should be found to be unlighted, this represents a malfunction and the pilot is required to do what is necessary to correct the situation. This consists of first moving the actuator 16 up to its neutral position, and then pressing, and holding in switch closing position against spring resistance, an emergency landing gear lowering switch button 24 of a normally open switch, long enough for an unlowered wheel or wheels to be lowered—in other words, until all of the lights I1, I2 and I3 are seen to be illuminated.

The student pilot has now gone through exactly the procedures which will be required of him to make sure that he would have the landing gear down if he were flying a retractible landing gear plane, and he may now proceed to land the non-retractible landing gear plane in which he is actually flying.

This in-flight training is not so simple and obvious as it would be if the same routine were pursued in an airplane merely sitting on the ground. The pilot must time the described operations so that he will have ample time for a corrective adjustment if a malfunction is indicated. What indicated condition the simulator will come up with is purely a matter of chance, beyond the pilot's control. The pilot must give due attention to other traffic in the air and on the ground, and to instructions and advice from the control tower. If he has not perfected the simulated landing conditions in time, he must either circle the field again or land contrary to simulated indications, scoring himself a failure for that attempt.

Malfunction indications of the simulator are caused to occur with much greater frequency than they do in actual practice, but they are not prearranged or contrived in advance by a student or instructor.

Switches SW1A, SW1B and SW1C are operated simultaneously and without variation by actuator 16. In the up position of the actuator 16, the switch SW1A is open, the switch SW1B is closed, and the switch SW1C is in a raised, closed condition. The three switches are shown in FIG. 1a, however, as they would appear with the actuator 16 in its down position. The switch SW1B is open, the switch SW1A is closed, and the switch SW1C is in its down closed position.

During movement of the actuator 16 from the up to the down position, the relaxation oscillator 33 is totally disconnected from the twelve volt source, so that closing of the switch SW1A initiates the timing of the simulator to zero.

It should be noted that the mechanical arrangement of SW1A, SW1B, SW1C is such that when moving the actuator 16 from the "up" position to the "down" position, SW1B closes before the switch SW1C completes its downward, closing movement. This insures that flip-flop H is initialized to the high $\bar{Q}$ state before a high potential input is impressed at "*b*" of G1.

During the period of total disconnection of the oscillator, the application of potential through resistor R5, as controlled by a Zener diode CR1, to an inverter E4 is interrupted, causing the output of the inverter to go positive. This positive signal at the CD input of flip-flop H causes the Q output of H to go to the low state. This assures that flip-flop H will be placed in a proper state to accept a pulse from the relaxation oscillator and to respond to it in a desired manner.

Lowering of the actuator 16 actuates the relaxation oscillator 33. The relaxation oscillator comprises resistors R1, R2, R3 and R4 of which R3 is a variable resistor, also capacitors c1 and c2 and a unijunction transistor Q1. Adjustment of resistor R3 controls the time required for generating the pulse.

During the "landing gear lowering" period, before the pulse that initiates flip-flop H, the Q output of flip-flop H is low. The "*a*" input to and gate G1 is low and the gate G1 will transmit a low signal to input CD of master flip-flop C1. The Q output of C1 will accordingly be high and the $\bar{Q}$ output of C1 will be low. Since the $\bar{Q}$ output of master flip-flop C1 will be low, the "*a*" input to each of the and gates A1, A2 and A3 will be low, and none of the lights I1, I2 and I3 can be illuminated during this "landing gear lowering" period.

During the "landing gear lowering period" the high Q output of master flip-flop C1 is applied as "*a*" input to and gate B3. A free-running multivibrator 26 composed of inverters E1 and E2, resistors R7, R8, R9 and R10, and capacitors C3, C4 and C5, followed by a further inverter E3, continuously applies pulses as "*b*" input to and gate B3. Since high "*a*" input is continuously provided to and gate B3 throughout this period, these "*b*" input pulses continuously result in output pulses to a decade counter X1 which is composed of a series of successive flip-flops D1, D2, D3 and D4.

Flip-flop D1 changes output state continuously, as long as B3 is enabled, the same being transmitted simultaneously to flip-flops D2 and D3, and every tenth pulse to flip-flop D4 and through or gate F3 as "*b*" input to and gate A3.

The flip-flops D1 to D4, inclusive, are combined as shown, so that D4 feeds into flip-flop C2, causing $\bar{Q}$ output of C2 to go through or gates F1, F2, and F3 and provide continually varying "*b*" input to all the and gates A1, A2 and A3.

Flip-flop D1 has a direct connection through or gate F3 to provide "*b*" input to and gate A3, so that there will be "*b*" input to and gate A3 any time that there is Q output from D1 or $\bar{Q}$ output from C2.

Flip-flop D2 has a direct connection through or gate F2 to and gate A2, so that there will be "*b*" input to and gate A2 any time there is Q output from flip-flop D2 or $\bar{Q}$ output from C2.

Flip-flop D3 has a direct output through or gate F1 to and gate A1, so that there will be "*b*" input to and gate A1 any time there is Q output from flip-flop D3 or $\bar{Q}$ output from C2.

It will be apparent from the drwing that all the flip-flops D1 to D4, inclusive, of the decade counter have ground connections; also that D1 and D3 have $\bar{Q}$ connections through or gate X2 to D4, and that D4 has a feedback to connection through an inverter X3 to D2.

These details could, of course, be varied in many ways within the scope of the invention.

As a result of an arrangement as described, "b" input appears at gates A1, A2 and A3 in rapidly changing, varied fashion, but all to no avail until the first timed impulse reaches the flip-flop H from the relation oscillator, marking the end of the "landing gear lowering" period.

The trailing or waning edge of the impulse referred to changes the output Q of flip-flop H from low to high, with the result that high "a" input to and gate G1 is now provided. Coupled with the already present high "b" input at that gate, this transmits an input from G1 to CD of flip-flop C1 which drives the output of flip-flop C1 from Q to $\bar{Q}$. High $\bar{Q}$ output is maintained so long as the actuator 16 remains in its down position. High "a" input to and gates A1, A2 and A3 is therefore provided and maintained.

At the same time, the high "a" input to and gate B3, furnished from C1 through Q of C1, is discontinued and the "b" inputs to and gates A1, A2 and A3 are frozen as of that instant.

As a result, the new combination of maintained high "a" input with what was random high "b" input at that instant for any one or more of the gates A1, A2 and/or A3 will through resistors R11, R12 and R13 turn on the associated transistor or transistors Q3, Q4 and/or Q5, causing lights I1, I2 and/or I3, as the case may be, to become illuminated. These lights are maintained on by virtue of the fact that where both the "a" and "b" inputs to any one of the and gates A1, A2 and A3 are maintained high, the associated transistor will be turned on.

Subsequent periodic impulses induced by the relaxation oscillator will have no effect either to quench the initially illuminated lights or to illuminate others.

As has been stated, if any one or more of the lights I1, I2 and I3 fails to come on, emergency "landing gear lowering" means must be brought into play.

This involves the pressing of a button 24 against spring pressure to close and keep closed a switch SW2 until all three of the lights I1, I2 and I3 have become illuminated.

The closing of switch SW2 supplies energy through and gate G to flip-flop C2 at CD, to assure a maintained high output through $\bar{Q}$ of the flip-flop C2 to provide high "b" input through or gates F1, F2 and F3 to all the and gates A1, A2 and A3. This assures that all the lights I1, I2 and I3 will be turned on and will stay on, either until the master switch (not shown) is turned off, or the actuator 16 is operated to another position. Release of the button 24 automatically results in the opening of switch SW2, but this does not extinguish any of the green lights.

If any of the indicator lights I1, I2 or I3 fails to light at the conclusion of what should be the gear lowering period, it is because flip-flop C2 is in the Q high state. Closing SW2 places a positive potential at the CD input of C2 and drives the $\bar{Q}$ state high and Q low. This insures that all the outputs of the or gates F1, F2, F3 are high, A1, A2, A3 outputs are high, and lights I1, I2 and I3 are illuminated. C2 will not change state until it is again influenced from D4 to do so.

It has been mentioned that when the pilot throttles down the engine, he necessarily closes switch SW3. If this is done before the output of master flip-flop C1 has been transferred from Q to $\bar{Q}$, the high Q output of C1 will furnish high "b" input to an end gate B1 at the same time that the closing of the switch SW3 furnishes high "a" input to the same and gate. The and gate B1 will therefore transmit an effective output through diode CR2 to turn on transistor Q2 and thereby cause the red light 15 to be energized and the device 17 to be sounded as a warning that the prescribed procedure is being violated. The throttle must then be operated to speed up the engine so that the switch SW3 may open for deactivating the red light 15 and the sounding device 17.

This function is disabled whenever C1 changes to high $\bar{Q}$ state, meaning that if throttle switch SW1B is closed and a warning of unsafe is being given, the act of the gear coming down will inhibit this function.

There is the possibility also that through being distracted by other matters demanding his attention, the pilot may be caused to overlook the fact that at least one of the green lights I1, I2 and I3 has failed to light. The system as illustrated makes provision for calling this fact emphatically to the attention of the pilot by lighting the red light 15 and sounding the device 17 when a malfunction is thus indicated. These signals will persist until the emergency landing gear down procedure is initiated.

To this end, the outputs of and gates A1 and A2 which turn on the green lights I1 and I2, respectively, go also to and gate A4 so that if either fails there will be no output from A4. The output of gate A4, if any, and the output of and gate A3 which should turn on green light I3, both go to and gate B4, and if either fails there will be no output from B4. Thus the input to an inverter E5 will be high, and the output from the inverter will be low, only if all three green lights I1, I2 and I3 are turned on. If any one of the three green lights is not turned on, the output from inverter E5 will be high.

The output from inverter E5 and the $\bar{Q}$ output from master flip-flop C1, which is high at and after the turning on, or the intended turning on, of part or all of the green lights through lowering of actuator 16, go to an and gate B2, If there is no output from B2, it will be because the output from inverter E5 is low, and this, in turn, will be because the input to inverter E5 is high. A high input to inverter E5 can be had only if all three green lights are lighted. In that situation there is no need for a warning signal to be given and none will be given. If, however, the input to E5 is low there will be output from and gate B2, transistor Q2 will be turned on, and red light 15 and sounding device 17 will be activated, to warn of danger. The emergency "landing gear lowering" button 24 must then be operated as already explained.

When the green lights I1, I2 and I3 have all been lighted, and the devices 15 and 17 have been deactivated, the plane may be landed.

If the pilot plans to go around again after landing, he may take off without further attention to the simulator, with the actuator 16 down. If, instead, he parks the plane in a hangar or elsewhere, he may leave the actuator 16 in its down position.

When the plane is parked and the master switch is opened, all power is cut off from the simulator and all parts of the simulator are deactivated. If the simulator controls are left as set for landing with the actuator 16 in its depressed position, the turning on of the master switch will either bring about the "landing gear lowering" cycle as described above, or it may immediately light part or all of the green lights I1, I2 and I3. If only a part of the lights are turned on, the emergency gear down procedure should be initiated until all three green lights are lighted.

This represents a slight departure from the procedure required on retractible landing gear aircraft, where all the green lights should come on immediately without any attention from the operator. It is not an objectionable departure, however, because the pilot of a retractible landing gear plane should check his landing gear indicating lights at once, to make sure that the indicating system on his plane is in good order.

Having made sure that all the green lights are on, the student pilot may proceed to take off. As soon as he is airborne and has attained a safe altitude for retracting the landing gear, he should proceed to "retract it."

This is done by placing the actuator 16 in its raised position with the consequence that the switch SW1C is placed in a raised, closed position. This places positive potential on "b" input of and gate G2 through resistor R16. And gate G1 is disabled. It also causes the relaxation oscillator to generate a pulse after the usual period of delay.

The resulting pulse transmitted from the relaxation oscillator toggles flip-flop H, causing Q to go high. This high state is sensed as "a" input of and gate G2. Since the "b" input of G2 is also high, the corresponding high output of G2 is placed on "a" input of and gate G3. Since the $\bar{Q}$ output of C1 is high, and this appears as "b" input of gate G3, the high output appears as toggle input (T) of C1. This does not change the state of C1.

The next generated pulse from the relaxation oscillator changes the state of H, causing $\bar{Q}$ to go high; the G2 output goes low; G3 output goes low; and it is the trailing edge of this event that toggles C1 to change state, i.e., to cause the Q output of C1 to go high. Since it takes two impulses from the relaxation oscillator to change the state of flip-flop C1, the simulated landing gear retraction time is twice as long as the landing gear lowering time. This is a desirable feature because it accords with reality.

Since $\bar{Q}$ of C1 goes low, this insures that the output of and gate G3 remains low and that flip-flop C1 will not be toggled to different states by further impulses. C1 will only change state from Q high as a result of a high input to its CD input.

Transference of the output to Q in the present instance renders and gates A1, A2 and A3 inactive, and thereby extinguishes all of the green lights. They will not come on again until the actuator 16 is again placed in its lower position, and possibly then only when this is followed by a temporary closing of the emergency switch button 24.

The actuator 16 will be maintained in its raised position during normal flight.

The foregoing description is believed adequately to describe the simulator for the benefit of those skilled in the art to which it appertains.

Should further clarification be required, reference may be had to Technical Data—Motorola Digital Integrater Circuits, published by Motorola Semi-Conductor Products, Inc., of Box 20912, Phoenix, Ariz., in which the A, B and G gates are disclosed as MC9813P, dated March, 1969; the J K flip-flops C1 and C2 are disclosed as MC871P, dated March, 1968; the D flip-flops are disclosed as MC880P, dated November, 1970; the E inverters are disclosed as MC889P, dated June, 1970; the F or gates are disclosed as MC816P, dated October, 1967; and the H flip-flop is disclosed as MC816, dated October, 1967.

We have described what we believe to be the best embodiment of our invention. What we desire to cover by letters patent, however, is set forth in the appended claims.

We claim:

1. A practice, in-flight simulator for use on fixed landing gear aircraft for the benefit of a pilot who wishes, without jeopardy, to perfect the technique of managing retractible landing gear aircraft, comprising, in combination,
   a. a primary control member corresponding to a normal landing gear lowering and raising control member of retractible landing gear aircraft, said member having a "landing gear retracting" position and a "landing gear lowering" position;
   b. simulated malfunction indicating means responsive to operation of said primary control member to the "lowering" position, randomly to indicate either a normal lowering of landing gear to operative position or a malfunction of one or more elements of the landing gear;
   c. a further control member, corresponding to an emergency landing gear lowering control member of retractible landing gear aircraft; and
   d. means responsive to said further control member, when a malfunction has been indicated, for readjusting the indicating means to indicate that the intended lowering has been properly and effectively performed.

2. A practice, in-flight simulator as set forth in claim 1 which includes an aircraft throttle, and a supplemental warning means responsive to cutting the throttle with the primary control member not in "landing gear lowering" position to sound an audible warning signal.

3. A practice, in-flight simulator as set forth in claim 2 in which the supplemental warning means also includes a steady danger light which is turned on and off in unison with the aduible warning signal.

4. A practice, in-flight simulator as set forth in claim 3 in which the means for activating the supplemental warning means, when the throttle is prematurely cut, is constructed and arranged also to activate whenever the primary control member has been placed in "landing gear lowering position" but a malfunction of one or more of the landing gear elements is indicated.

5. A practice, in-flight simulator as set forth in claim 1 in which the malfunction indicating means comprises a series of lights corresponding, respectively, to the several retractible elements of a retractible landing gear, each light, when illuminated, signifies that the landing gear element which it represents has been successfully lowered.

6. A practice, in-flight simulator as set forth in claim 5 which includes a relaxation oscillator directly responsive to the primary control member for developing and transmitting a significant light control pulse only after a predetermined "landing gear lowering period," said relaxation oscillator including a variable resistor settable to regulate the duration of such period.

7. A simulator as set forth in claim 6 in which an AND gate is included in the control means for each light, which gate requires both *a* and *b* inputs for illumination of the light to be effected, said simulator further including a master flip-flop, and means including a free-running multivibrator and a decade counter which is made responsive to the multivibrator throughout the "landing gear lowering" period by the master flip-flop, with the result that throughout that period differing and varying outputs of the decade counter are furnished as *b* inputs to the several light controlling AND gates while all *a* inputs to the AND gates is suppressed by the master flip-flop, the master flip-flop being subject to a change of state by the relaxation oscillator generated pulse, simultaneously to cause steady and effective *a* inputs to be furnished to all of said light controlling AND gates, and to cut off input from the multivibrator to the decade counter, thereby to freeze the *b* inputs from the decade counter to the several light controlling AND gates at whatever values they happen to have, effective or ineffective, at the instant of the change of state of the master flip-flop induced by the pulse generated by the relaxation oscillator.

8. A simulator as set forth in claim 7 in which the further control member corresponding to an emergency landing gear lowering control member of retractible landing gear aircraft consists of a normally open switch disposed in a circuit which includes a flip-flop through which *b* inputs may be furnished to all of the light controlling AND gates referred to, said switch being effective when held closed briefly to assure the setting of the flip-flop to a state for furnishing sustained, effective *b* inputs to all of the AND gates and thereby establishing and/or maintaining illumination of all the lights.

9. A simulator as set forth in claim 7 including means to restore the primary control member to the up position to thereby cause the relaxation oscillator to generate a timed pulse, which pulse through a change of circuitry brought about by the changed position of the primary actuator will reach the master flip-flop in such a way that the master flip-flop will undergo a change of state effective to terminate the furnishing of *a* inputs to the light controlling AND gates, and to re-establish the capability of the multivibrator to influence the decade counter output.

* * * * *